United States Patent [19]

Davies et al.

[11] Patent Number: 4,579,176

[45] Date of Patent: Apr. 1, 1986

[54] METHOD OF REMOVING HYDROCARBONS FROM AN UNDERGROUND FORMATION

[75] Inventors: David R. Davies, Seria, Brunei; Simon Zwolle, Rijswijk, Netherlands

[73] Assignee: Shell Oil Company, Houston, Tex.

[21] Appl. No.: 605,040

[22] Filed: Apr. 30, 1984

[30] Foreign Application Priority Data

May 6, 1983 [GB] United Kingdom ................. 8312564

[51] Int. Cl.$^4$ .............................................. E21B 43/24
[52] U.S. Cl. .................... 166/303; 166/272; 166/288
[58] Field of Search ............... 166/302, 303, 292, 288, 166/278, 276, 305 R

[56] References Cited

U.S. PATENT DOCUMENTS

| | | | |
|---|---|---|---|
| 3,055,425 | 9/1962 | Kerver et al. | 166/288 X |
| 3,070,161 | 12/1962 | Kerver et al. | 166/292 X |
| 3,087,542 | 4/1963 | Becker et al. | 166/292 |
| 3,090,435 | 5/1963 | Kerver et al. | 166/292 X |
| 3,205,946 | 9/1965 | Prats et al. | 166/288 |
| 3,367,417 | 2/1968 | McCabe | 166/303 X |
| 3,515,216 | 6/1970 | Gies | 166/288 |
| 4,232,740 | 11/1980 | Park | 166/288 X |

*Primary Examiner*—Stephen J. Novosad

[57] ABSTRACT

To prevent dissolution of sand grains or of the original bond between these grains around a well when hot aqueous fluid is passed through the well in an oil recovery process, the sand grains are at least once treated with a solution of Al ions in a solvent such as water. Such treatment with Al ions of sand grains is also beneficial when the grains have been consolidated by means of a silicon polyhalide. Attack of the bond between the grains by formation water is then considerably decreased.

9 Claims, No Drawings

METHOD OF REMOVING HYDROCARBONS FROM AN UNDERGROUND FORMATION

BACKGROUND OF THE INVENTION

The invention relates to a method of recovering hydrocarbons from an underground formation via a well which is at least partly surrounded at the level of the formation by sand grains.

Within the meaning of the claims and the specification the expression "sand grains" is to be understood to relate to grains substantially consisting of silica. The sand grains either consist of grains that are originally present in the formation, or of grains that have been introduced in or around the well for filling up voids around the well, for forming a gravel pack, or for any other reason.

The inflow into the well of sand grains that are entrained by the flow of fluid passing out of the formation into the well should be prevented. Such inflow of sand grains results in sanding-up of the well which requires costly cleaning operations when the production rate of the well decreases. Further, the tubing in the well as well as the surface equipment will be damaged by the erosive action of those sand grains that are passed to the surface by the fluid flow.

Inflow of sand grains into a well will occur when the bond between the formation sand grains is insufficiently strong to withstand the forces enacted thereon by the flow of fluid passing through the pore space of the formation into the well. One manner to solve this sand problem is to place a gravel pack in the well, such pack consisting of an unconsolidated volume of sand grains of predetermined size, which grains are kept in place by a screen pipe. The screen pipe is a short string of casing protecting the face of the producing formation and preventing, by means of its screening property, the formation sand grains from flowing into the well.

Failure of a gravel pack occurs when hot aqueous fluids pass through the pack over extremely long periods. The grains are partly dissolved in the hot fluid and the size reduction of the grains that accompanies such dissolution allows the grains from passing through the openings of the screen pipe and entering the well.

Further, a sand problem will be met in a well when passing hot aqueous fluid through an adjacent siliceous earth formation wherein the sand grains are interconnected by a silicate cementing material. Whereas no sand problem will exist in such well when low temperature fluids are passed therethrough, it will be found, however, that hot aqueous fluids dissolve the silicate cementing material thereby weakening the bonds between the grains until the strength of the bonds is insufficient to withstand the forces enacted on the grains by the fluid flow passing from the formation into the well. The sand grains are then sheared off and enter the well.

The majority of the consolidation processes that are suitable in formations wherein relatively cold fluids pass through the wells and the formation surrounding the wells, have been found to fail when the recovery process carried out in the formation is replaced by a process that includes the use of hot aqueous fluid. There are a limited number of processes, however, that render the formation resistant against the attack of hot fluids, but these processes are too costly for actual application. One such process is described in U.S. Pat. No. 3,393,737. A metal plating compound in the liquid phase is injected into the formation and deposits an uninterrupted metal layer over the surface of sand grains contacted by the compound. Although this metal layer forms an effective protection against degradation by hot aqueous fluid passing along the sand grains and the natural bond—if present—between the grains, no widespread application of this process has taken place since the process is chemically complicated and thus expensive as highly qualified chemists should be in charge of the operation.

U.S. Pat. No. 4,323,124 describes a method for inhibiting gravel pack and formation sand stone dissolution during water or steam injection, by coating the surface of the sand and the gravel with a fatty film of lecithin. A drawback is that the lecithin requires the presence of a dispersant to disperse it in the water phase of the treating liquid.

In U.S. Pat. No. 3,438,443 it is suggested to solve the dissolution problem by dissolving silica in the liquid phase of the hot fluid to be injected. By using a saturated solution of silica, the sand formation is protected from being leached by the hot fluid. Even sand grains that have previously been consolidated by an emulsion of water glass and kerosene followed by an aqueous solution of calcium chloride were found to be insoluble in the hot aqueous drive fluids oversaturated by silica. The tests wherein an oversaturated silica solution was used as a hot aqueous fluid indicated that no degradation of the consolidated sand took place, contrary to the use of solutions of sodium aluminate that were found to degrade the consolidated sand almost as rapidly as fresh water.

A drawback, however, of the use of oversaturated silicate solutions is that the amount of silica that is deposited on the sand grains when the solution cools down in the formation, will decrease the permeability of the formation, which requires continuously increasing pressures to maintain a constant injection rate of the hot aqueous fluid into the formation. Such increased injection pressures may even lead to fracturing of the formation, which results in by-passing of large formation parts by the injection fluid.

U.S. Pat. No. 3,603,399 discloses that in water-sensitive reservoir formations the adverse effects of clay swelling and clay migrating can be reduced by contacting the formation with an aqueous hydroxy-aluminum solution having a ratio of hydroxyl groups to aluminum atoms in the range of 1.5 to 2.7. U.S. Pat. No. 3,756,315 discloses that a basic aqueous solution of an alkali metal aluminate and a pH reducing reactant for subsequently reducing the pH to one at which a hydrated aluminum oxide is precipitated can be used to plug, consolidate, or coat, a reservoir formation. Neither of those problems or solutions are indicative of what might be done regarding the problems due to the dissolving of siliceous sands or cements.

SUMMARY OF THE INVENTION

This invention relates to recovering hydrocarbon fluid from an underground formation by injecting hot aqueous liquid into the formation and into contact with the hydrocarbon fluid and siliceous grains and/or intergranular cements in or around a well. The invention provides an improvement for reducing the extent of dissolution of said siliceous materials. The improvement comprises dissolving in at least one polar solvent at least one compound which releases aluminum and/or aluminate ions within the resulting solution. The hot aqueous liquid and/or the polar solvent, which solvent may comprise some or all of the hot aqueous liquid, are injected so that the siliceous material is contacted by the aluminum and/or aluminate ions at least substantially as soon as it is contacted by hot aqueous liquid. The hydrocarbon fluid is recovered from the fluid which displaced through the pores of the reservoir by the injection of fluid into the reservoir.

Applicants have now found that dissolution of siliceous material around a well by aqueous liquid that passes through the pore spaces of such material, can be diminished in a relatively simple manner, regarding the dissolution of sand grains or cement being contacted by hot aqueous fluid, whether the grains or cement were a part of the original structure of the formation, or form part of the material that has been passed downhole of the well after the well has been drilled, such as gravel pack material. Also, the method can be used to inhibit degradation by formation water of the bonding material between grains that have been artificially consolidated by hydrolysis of silicon polyhalide.

DESCRIPTION OF PREFERRED EMBODIMENTS

In one embodiment of the invention, an aqueous liquid and said solution are injected into the formation at a temperature above 50° C. Alternatively, an aqueous liquid and/or said solution may be injected into the formation in the presence of steam.

The solvent to which the aluminum and/or aluminate ions are added may be water, ethanol or any other compatible polar liquid or mixture thereof. When the aqueous liquid is injected into the formation via a well, at least part of the aqueous liquid may constitute at least part of the solvent to which said ions are added.

When sand grains have been artificially consolidated by means of a silicon tetrahalide treatment, the cementing bond thus formed can be protected against dissolution by formation water passing from the formation into the well together with oil and/or gas that flows from the formation into the well, by treating the grains with a solution of Al ions in a polar solvent. This solution is passed through the well to the sand grains, and kept either stagnant for a predetermined period in the zone to be treated, or passed therethrough at a relatively low rate. This treatment may be carried out either only once or periodically.

As has already been observed hereinabove, the present method is suitable for protecting siliceous formations and gravel packs wherein the grains consist of siliceous material, against degradation by the action of aqueous liquid passing therethrough. The sand grains of a formation are consolidated either naturally, or artificially by the action of silicon polyhalide. The grains of a gravel pack are normally unconsolidated but in the event that they have been artificially consolidated this should have been done by the action of silicon polyhalide.

Naturally consolidated sands are present in a number of formations. These sands do not require a consolidating treatment by means of a silicon polyhalide, unless the compressive strength thereof is insufficient to maintain the sand grains in place at the flow rates of the fluids that are produced through the pore space of the grains.

Before carrying out the method according to the invention in a production well, all sand grains around the well at the production level thereof that may enter the well during the production period should be treated by means of silicon polyhalide to interconnect the sand grains or strengthen the bond that is originally present between the grains.

Injection wells wherein sand problems may occur during backflow of fluid into the well are mostly provided with a gravel pack. Such pack does not require a silicon polyhalide pretreatment for interlocking the grains of the pack, since the grains of the pack are trapped between the screen pipe and the formation.

Silicon polyhalide can be easily handled in the field to consolidate unconsolidated formations, to increase the compressive strength of incompetent formations, and to interconnect loose sand grains in or around wells. Suitable silicon polyhalides have a water reactivity substantially equal to that of silicon tetrachloride. Examples of such halides are silicon tetrachloride, silicon hexachloride, silicon octochloride, and silicon tetrafluoride.

Consolidating procedures by means of silicon tetrahalide are extensively described in U.S. Pat. No. 3,005,426 and in British Pat. No. 1,536,209. In the consolidation method of U.S. Pat. No. 3,055,426, a silicon tetrachloride-oil solution is passed into an oil-containing formation. The silicon tetrachloride reacts with the connate water in the formation pore space thereby undergoing a hydrolysis reaction and forming a precipitate that bonds the sand grains together without appreciably diminishing the permeability of the treated zone. U.S. Pat. No. 3,055,425 mentions the application of heat to the zone consolidated by the action of silicon tetrahalide to a temperature above of about 150° C. for at least six hours to stabilize the consolidated zone against the flow of water therethrough. The heating may be carried out by a hot fluid such as steam or water. Tests carried out by applicant, however, gave no indication of an appreciable diminishing of the degradation of the consolidated zone by treating the zone with hot aqueous fluid. According to the same patent, the heat may also be supplied by a downhole burner. A drawback is that the use of such a burner requires complicated and expensive procedure.

U.S. Pat. No. 3,070,161 describes a method of stabilizing a formation zone consolidated by the action of silicon tetrahalide, against the action of water by making the consolidated zone oil wettable. Applicants, however, found that this treatment results in a large permeability reduction of the formation.

The method of British Pat. No. 1,536,209 is designed for consolidating incompetent parts of a silicate formation containing gas, such as hydrocarbon gas. Silicon tetrahalide is injected via the well into the formation in gaseous form together with a carrier gas. The silicon tetrahalide gas is dissolved in the connate water present on the pore space walls of the gas-containing formations. The silicon tetrahalide is hydrolyzed thereby forming a precipitate that bonds the sand grains together (when the formation is unconsolidated) or strenthens the bond between the sand grains (when the formation is naturally consolidated but has a low compressive strength). This method can also be used in an oil-containing formation wherein the part to be treated has before hand been freed from oil by a gas injection. The consolidated material proved to be stable in stagnant water. To protect the consolidated material against flowing water it was advised to render the material oil wettable either solely at the surface thereof, or throughout the bulk of the material. Unfortunately, the resistance against the attack of flowing water proves to be rather weak.

Before describing the invention in more detail, some general observations thereon will be given in the following paragraphs.

Useful agents for application in the method of the present invention, which agents—after being dissolved in a solvent such as water—release aluminum and/or aluminate ions, are inter alia aluminum citrate, aluminium chloride and sodium aluminate. Aluminium chloride is preferred when the solution has a pH below 4. At a pH above about 11.5, it is preferred to use sodium aluminate as a source for aluminate ions. Aluminium citrate can be generally used, but is in particular suitable for use in aqueous solutions having a pH between 4 and 11.5.

It will be appreciated that the amount of aluminum ions is chosen to be effective in preventing or at least to a substantial amount diminishing the degradation of the consolidated part of the formation via which fluids pass from the bulk of the formation into the well and vice versa.

A suitable amount of these agents when applied for (periodically) treating an artificially consolidated formation or artificially consolidated gravel pack against the attack of formation water (such as connate water that is produced from a gas formation) is between 0.5 and 100,000 ppm of Al in a solution of a polar solvent. Particularly suitable concentrations of aluminum ions are between 10 and 50,000 ppm. The solution is obtained by mixing the agents with a volume of polar solvent, such as water. The solution is passed into the formation pore space of the zone that has earlier been consolidated by means of silicon polyhalide, and kept stagnant therein for a predetermined period. The treatment may be repeated as many times as required. Also, the solution may be pumped slowly through the zone to be treated.

When the hydrocarbon recovery process comprises the step of injecting hot aqueous fluid into the formation, the agents may be continuously or periodically added to the flow of hot aqueous fluid that is being injected into the well. A suitable amount of the treating agent is between 0.5 and 100,000 ppm of Al in the liquid phase of the hot aqueous fluid injected for increasing the recovery rate of hydrocarbons from the formation. Particularly suitable concentrations of Al ions are between 10 and 50,000 ppm.

The hot aqueous fluid that may be injected in one of the embodiments of the present invention for displacing oil in an underground formation towards one or more production wells penetrating the formation, may be either hot water or wet steam. The wet steam consists partly of steam and partly of hot water. The hot water may comprise salts as well as other agents that have been added on purpose to the hot water for treatments other than protecting the consolidation of the formation against the attack of hot fluids. Such agents may have been added for carrying out surface treatments of the injection water prior to injecting the water into the well. Well known agents for such purpose are lime soda (softener), ammonium bisulphite (oxygen scavenger) and polyphosphonate (scale inhibitor).

If brine is used as an injection fluid, such brine may well contain trace amounts of Al ions. These amounts of Al ions originally present in water that is available at the site where the enhanced oil recovery method is carried out, are in general less than 0.2 ppm, and are too small to effectively prevent degradation of the consolidated formation. Therefore the amount of Al ions in the brine should be increased to a level sufficiently high to prevent such degradation.

The rate at which degradation of the formation takes place during the passage of aqueous fluid therethrough is decreased or even stopped by the presence of Al ions therein. The mechanism by which Al ions are capable of preventing the degradation of gravel pack or formation is not yet fully understood. It is theorized, however, that in the presence of water at least some of the Al ions are converted into aluminate ions $Al(OH)_4$ which react with the silica surface of gravel pack or formation to produce a relatively insoluble alumino silicate.

The invention will now be described by way of example in more detail with reference to the following Examples and Designs for a field experiment.

EXAMPLE I 200 gram of 20/40 US mesh Ottawa sand was packed in a cylindrical core holder and liquid water (pH=6.2) was pumped through at a rate of 10 ml/min.; temperature 350° C.; pressure 200 bar. The silica concentration in the effluent water was measured at regular intervals using a spectrophotometer. On average 500 ppm was detected. In a second experiment an aqueous Na-aluminate solution (pH=12.7) containing 50 ppm Al was pumped through the same pack under the same conditions as in the first experiment. It was found that after having pumped 350 ml (=8 pore volumes) of the above Na-aluminate solution, the silica concentration in the effluent had decreased from 500 to 140 ppm. Thus, the degree to which silica is dissolved by hot aqueous fluid is considerably decreased by the addition of Al ions to the fluid. It will therefore be appreciated that this method is attractive to decrease the degree at which the sand grains of a gravel pack in an injection well are dissolved, through which injection well continuous injection of hot aqueous liquid takes place for enhanced oil recovery purposes.

EXAMPLE II 250 gram of Oude Pekela sand was mixed with 5%w water and packed in a core holder. The pack was subsequently consolidated by the action of silicon tetrachloride by passing the silicon tetrachloride in the vapor phase through the pore space of the water wet sand grains. Thereupon tap water was flushed through the pore space at various pumping rates and the silica concentration of the effluent was monitored (see Table A). This was followed by pumping an aqueous aluminium citrate solution (pH=8), containing 5400 ppm Al, into the core which was then shut in for 16 hours. Pumping of tap water was thereupon resumed and the silica concentration in the effluent monitored. The results shown in Table A indicate that the treatment with aluminium citrate reduced the silica solubility dramatically. As a result thereof the silica bond between the grains was less dissolved than before the treatment with aluminium citrate, which will result in only a minor decrease of the compressive strength of the consolidated sand pack.

TABLE A

| Action/Status | Pumping rate (cc/min) | Silica Concentration in effluent (ppm) |
| --- | --- | --- |
| Before | 0.3 | 260 |
| treatment | 0.5 | 260 |

TABLE A-continued

| Action/Status | Pumping rate (cc/min) | Silica Concentration in effluent (ppm) |
| --- | --- | --- |
|  | 4.7 | 220 |
| After | 0.5 | 20 |
| treatment | 5 | 6 |
| with |  |  |
| Al-citrate |  |  |

All experiments of Example II have been carried out at 70° C.

It will be appreciated that this method is attractive for use in a gas containing formation that has been consolidated by means of a silicon polyhalide treatment. The pretreatment of the consolidated area (situated around the production well) by Al ions will diminish the attack of the consolidated area by formation water that passes through this area in the production stage together with gas that is being produced from the formation.

Design for a field experiment I

In an oil containing undergound formation, hot water is being injected via a plurality of injection wells and oil is being displaced by the hot water through the formation pore space towards production wells, via which wells the oil is lifted to the surface.

Since the hot water injection is stopped from time to time, backflow of fluid will occur in the injection wells. As long as the formation area around the wells consists of consolidated sand grains, no sand will enter the wells when backflow occurs. However, prolonged injection of hot water via the wells into the formation will dissolve the cement bond between the sand grains which results in unconsolidated formation parts around the wells. When backflow occurs, sand will enter the wells and plug the passage therethrough. To prevent the deterioration of the cement bonds by the flow of hot aqueous liquid therealong, aluminium citrate is continuously added to the hot water that is being injected into the wells. 50 ppm of aluminium is considered sufficient to prevent the formation of a loose pack of grains around the well, which grains might otherwise enter the wells and plug the well when the flow of fluid is interrupted occasionally.

Design for a field experiment II

Under the conditions as mentioned in the above Design I, the continuous injection of aluminium citrate into the flow of hot water that is being passed into the injection wells is replaced by a periodic injection of aluminium citrate. The concentration of the Al ions is then increased to 5000 ppm and takes place as many times as required at suitable intervals.

Design for a field experiment III

In the Design II, one or more of the periodic injections of Al citrate into the flow of hot water that is being passed into the wells, is or are replaced by the injection of an aqueous solution of Al ions at ambient temperature.

Design for a field experiment IV

Wet steam is being injected into an oil containing underground formation via a plurality of wells. The oil is driven through the formation to production wells. The formation parts around the injection wells have a relatively low compressive strength, and to prevent sand inflow into the wells when the steam injection is stopped, a gravel pack has been installed in each well. The pH of the injected wet steam is relatively low, and thereto aluminium chloride has been selected as a source for the Al ions that are added to the wet steam to decrease the dissolution of the sand grains of the gravel packs in the wells. Thus, no sand will enter the wells when backflow of fluid into the well occurs when the steam injection is stopped during repair operations.

Design for a field experiment V

Relatively dry gas is produced from an underground formation via a plurality of production wells. The formation originally consisted of loose sand grains and to prevent the grains from being entrained by the flowing gas and being deposited in the wells, a sand consolidation treatment has been carried out in the early life of the wells. This sand consolidation treatment was carried out by injecting silicon tetrahalide in a carrier gas via each well into the pore space of the formation part around the relevant well. The silicon tetrahalide thereby formed a silica gel on the sand grains by a hydrolyzing reaction taking place between the silicon tetrahalide and the water film present on the pore space of the formation part being treated by the consolidation process. Hereby the loose sand grains were bonded together without an appreciable permeability reduction.

During the following production period, the water film on the untreated formation parts will, however, not remain stagnant but enter the treated formation part under influence of the flow of gas that is being produced via the production wells. This water on passing through the pore space of the consolidated formation parts will slowly dissolve the silica gel bonding the grains together, which will eventually lead to the production of loose sand grains that are entrained by the flowing gas to the production wells. To prevent this dissolution of the cement bond, the consolidation areas around the well are periodically treated by a volume of liquid having Al ions dissolved therein.

The liquid volume may consist of water containing 6000 ppm Al, which volume is kept stagnant in the formation part to be treated for about 24 hours. After the production of the gas out of the formation is resumed, the liquid volume flows into the wells from which it is recovered. The treatment is repeated as many times as required depending on the aggressiveness of the formation water.

Design for a field experiment VI

The solution of Al ions as applied in Design V that is kept stagnant in the formation parts to be treated, is replaced by the use of a solution of 50,000 ppm aluminium citrate in water that is injected slowly a period of about one hour. This solution of Al ions is at least once formed. If required the mixing of Al ions with water is repeated before injecting the solution into the formations, as many times as required at suitable intervals. In the majority of cases the treatment should be repeated every 6 months, but it will be appreciated that the length of the period over which production takes place before sand troubles can be expected, depends on the aggressiveness of the formation water, as well as on the concentration of Al ions in the aqueous solution.

Design for a field experiment VII

Oil is to be recovered via a well that penetrates an unconsolidated sand formation. The sand is oil wet. To decrease the inflow of sand grains into the well during recovery of oil and formation water, the formation part around the well is first made water-wet. Thereto an aqueous surfactant solution is injected into the said formation part. Suitable surfactants for this purpose are alkylaryl sulphonates and polyethylene oxide esters.

Subsequently a solution of silicon tetrachloride in kerosene is passed into the said formation part. The silicon tetrachloride reacts with the water present on the water-wet walls of the pore space of the formation part to be consolidated, thereby bonding the grains together by the precipitate resulting from the reaction.

Thereafter, the consolidation grains are at least once treated by an aqueous solution of Al chloride, and the well is opened for production of oil together with formation water. The treatment with Al ions is repeated as many times as required at suitable intervals and at Al concentrations that are required for slowing down the rate at which the silicate gel that bonds the grains together, is dissolved by the formation water passing through the pore space of the consolidated formation part.

What is claimed is:

1. In a process for recovering hydrocarbon fluid from a subterranean reservoir formation by injecting hot aqueous liquid into the formation and into contact with the hydrocarbon fluid and siliceous grains and/or cementing material in or around a well, the improvement for reducing the extent of dissolution of the contacted siliceous material comprising:

dissolving in at least one alkaline polar solvent at least one compound which releases aluminate ions within the resulting solution;

injecting alkaline hot aqueous liquid and said aluminate ion-containing solution so that said siliceous materials are contacted by aluminate ions at least substantially as soon as those materials are contacted by the alkaline hot aqueous liquid; and recovering hydrocarbon fluid which is displaced through the pores of the reservoir by the injection of fluid into the reservoir.

2. The method according to claim 1, wherein the alkaline hot aqueous liquid and the aluminate ion-containing solution are injected into the reservoir formation at a temperature above 50° C. and the pH of the alkaline hot aqueous liquid is at least about 8.

3. The method according to claim 2, wherein the alkaline hot aqueous liquid and aluminate ion-containing solution are injected into the formation in the presence of steam.

4. The method according to claim 1, wherein the alkaline hot aqueous liquid which is injected into the formation constitutes at least part of the solvent within which said aluminate ions are released and said compound which releases aluminate ions is sodium aluminate and/or sodium aluminum citrate.

5. The method according to claim 1, wherein the hot aqueous liquid consists essentially of water recovered from the well through which the hot aqueous liquid is periodically injected.

6. The method according to claim 5, wherein said siliceous sand grains and/or cementing materials are periodically treated by a solution of said ions.

7. The method according to claim 6, wherein the solution of said ions is kept stagnant in the formation for a predetermined period.

8. The method according to claim 1, wherein the solution contains between 0.5 and 100,000 ppm of aluminium ions.

9. The method according to claim 8, wherein the solution contains between 10 and 50,000 ppm of said ions.

* * * * *